UNITED STATES PATENT OFFICE.

CHARLES KORFF, OF NEW YORK, N. Y.

IMPROVED ARTIFICIAL FUEL.

Specification forming part of Letters Patent No. 48,564, dated July 4, 1865.

*To all whom it may concern:*

Be it known that I, CHARLES KORFF, of the city and county of New York, have invented a new and Improved Method of Making Coal from Coal-Dust; and I hereby declare the following to be a full and exact description thereof.

The nature of my invention consists in combining coal-dust with animal blood in forming it into a dough, and in pressing it into forms whereby an artificial coal is produced of good quality.

To enable others skilled in the art to make and use my invention, I will proceed to describe its construction and operation.

To one ton of mineral-coal dust I add about two gallons of animal blood, the best blood for that purpose being that of cows and oxen,) and one gallon of water. I then agitate this mixture until it obtains the consistency of pulp or dough. I then permit it to rest during about two hours. I then place it into forms of the size and shape required for the pieces of coal to be produced. I then press it into these forms, and after leaving it therein for a sufficient length of time to enable it to assume the form I remove it therefrom and dry it either by the application of heat or otherwise. After being thoroughly dried the said product will be ready for use in the same manner as natural coal.

What I claim as my invention, and desire to secure by Letters Patent of the United States, is—

The production of artificial coal out of mineral-coal dust, by combining the same with animal blood and water, substantially in the manner and for the purpose above described.

CHARLES KORFF.

Witnesses:
   CHS. WEHLE,
   HENRY WEHLE.